US008355889B2

(12) United States Patent
Hamamoto

(10) Patent No.: US 8,355,889 B2
(45) Date of Patent: Jan. 15, 2013

(54) ELECTRONIC BALANCE

(75) Inventor: Hiroshi Hamamoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 12/162,061

(22) PCT Filed: Jul. 30, 2007

(86) PCT No.: PCT/JP2007/064879
§ 371 (c)(1),
(2), (4) Date: Jul. 24, 2008

(87) PCT Pub. No.: WO2009/016713
PCT Pub. Date: Feb. 5, 2009

(65) Prior Publication Data
US 2010/0228522 A1  Sep. 9, 2010

(51) Int. Cl.
*G01G 7/00* (2006.01)
(52) U.S. Cl. ...................................... 702/173
(58) Field of Classification Search .................. 702/173
See application file for complete search history.

(56) References Cited

U.S. PATENT DOCUMENTS 4,029,161 A * 6/1977 Foster et al. ............... 177/25.15
4,882,784 A * 11/1989 Tump ............................ 700/305

FOREIGN PATENT DOCUMENTS

| JP | 56-108918 A | 8/1981 |
|---|---|---|
| JP | 09-068459 A | 3/1997 |
| JP | 11-211549 A | 8/1999 |
| JP | 2001-116615 A | 4/2001 |
| JP | 2001-133317 A | 5/2001 |
| JP | 2003-194624 A | 7/2003 |
| JP | 2006-078410 A | 3/2006 |
| WO | 2006/082915 A1 | 8/2006 |

* cited by examiner

*Primary Examiner* — Stephen Cherry
(74) *Attorney, Agent, or Firm* — Sughrue Mion, PLLC

(57) ABSTRACT

An electronic balance 1 having a switching function for selecting and setting one measurement mode from among a number of measurement modes corresponding to the type of object to be measured and/or the type of measuring work and/or the situation in terms of the work environment, an applied function for selecting and setting one display method from among a number of display methods for the weight of an object to be measured, and a basic function for gaining results of measurement of an object to be measured on the basis of the set measurement mode and display method is provided with: a number of menu operation keys 72a to 72e with which an input operation for selecting and setting one measurement mode from among a number of measurement modes and an input operation for selecting and setting one display method from among a number of display methods are carried out; and a number of basic operation keys 71a to 71d with which an input operation for gaining results of measurement for an object to be measured on the basis of the set measurement mode and display method is carried out, characterized in that the location where the above described number of basic operation keys 71a to 71d are arranged and the location where the above described number of menu operation keys 72a to 72e are arranged are at a distance from each other.

1 Claim, 6 Drawing Sheets

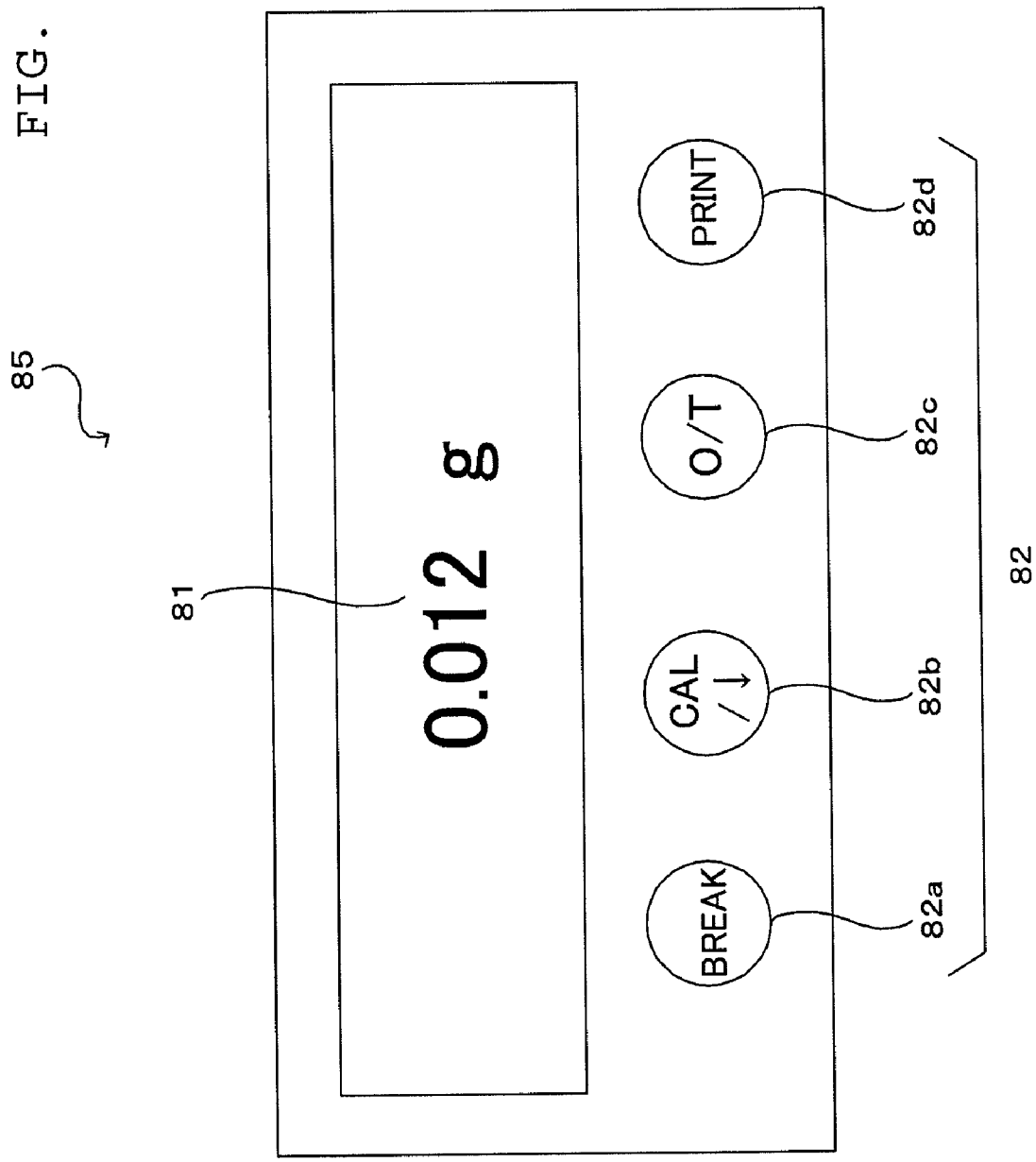

ELECTRONIC BALANCE

TECHNICAL FIELD

The present invention relates to an electronic balance, and in particular, to an electronic balance where an appropriate measurement mode can be selected from a number of measurement modes and set in accordance with the type of object to be measured, the type of measuring operation and the situation in terms of the work environment, and thus, a measuring operation can be carried out on an object to be measured on the basis of the set measurement mode.

BACKGROUND TECHNOLOGY

The weight measured by detecting the weight of an object to be measured using general electronic balances in many cases includes vibration when the object to be measured is placed on the measuring dish, and vibration from the outside, depending on the situation in terms of the work environment, such as air flow and vibration in the floor. In the case where a measuring operation is carried out on an object to be measured in a place which is subjected to the effects of air flow blown from an air conditioner, for example, the measured weight keeps fluctuating over the duration of measurement, due to vibration of the balance caused by the air flow from the air conditioner.

Therefore, electronic balances where the fluctuation of the measured weight of the object to be measured can be negated through an averaging process have been used, that is to say, the weight of the object to be measured is repeatedly detected and the measured weight is stored in a buffer in sequence, so that the weight, which has been measured the same number of times as a preset sampling number, from among the measured weight stored in the buffer, is calculated and the average weight is displayed on the display screen as the results of measurement.

In such electronic balances, it is necessary to remove weight measured in a vibrating state immediately after the object to be measured is placed on and removed from the measuring dish from the sampling data gained through an averaging process. Therefore, a threshold value of the width of fluctuation of the measured weight for determining whether or not the object is in a vibrating state (hereinafter referred to as amount of fluctuation in weight for starting averaging) and a threshold value of the time during which a state where the width of fluctuation in the measured weight becomes the weight of fluctuation in weight for starting averaging or less continues (hereinafter referred to as time during which stability continues) are set, and whether or not the object is in a vibrating state is determined from the relationship between the measured weight detected in sequence and the threshold values.

That is to say, when it is determined that the amount of fluctuation in weight which indicates chronographic change in the measured weight detected in sequence (width of fluctuation in weight) has become the amount of fluctuation in weight for starting averaging or less, and at the same time, it is determined that the time after the measured weight becomes the amount of fluctuation in weight for starting averaging has continued for a period of time which is longer than the time during which stability continues, it is determined that the object is in a "stable state," and thus, it is determined that the object is in such a state that an averaging process is possible.

Then, the measured weight starts being collected, when it is determined that the object is in a "stable state," and the average weight is calculated when the same number of measured weight as the preset sampling number is collected, so that the calculated average weight is displayed on the display screen as the results of measurement for the object to be measured.

As described above, in the case where various types of vibration noise are included in the measured weight, the results of measurement for the object to be measured can be gained after the effects of noise have subsided and the object becomes of a "stable state."

Incidentally, the average weight is calculated by collecting the same number of measured weight as the preset sampling number in these electronic balances, and therefore, it takes time for the results of measurement to be displayed on the display screen when the preset sampling number is large, and as a result, it takes time for the measurer to gain the results of measurement. Conversely, the effects of averaging become small when the set sampling number is small, and it becomes difficult for stable results of measurement to be gained.

In addition, in the case where it is desired to measure a certain amount of the object to be measured (for example powder or liquid) by adding (or removing) the object little by little, the value gained by carrying out an averaging process on the measured weight before and after the object is added or removed is displayed, unless the weight measured before and after the object is added or removed is removed from the averaging process. When the amount of fluctuation in weight resulting from addition or removal of the object to be measured becomes small, however, the amount of fluctuation in weight becomes the preset amount of fluctuation in weight for starting averaging or less, and in addition, continues for the time during which the stability continues or longer, and as a result, results of measurement gained through inappropriate sampling are displayed.

Accordingly, it has been desired for the contents of averaging processing to be adjustable in accordance with the weight of the object to be measured, the measuring operation (simple measurement of weight, gradual measurement and the like) and the work environment.

Thus, electronic balances where the contents of averaging processing can be set by selecting a "measurement mode" where appropriate contents are pre-adjusted in accordance with the type of object to be measured, the type of measuring operation and the situation in terms of the work environment have been developed.

For example, a "standard measurement mode" is provided for measurement where a general operation for measuring an object to be measured is carried out and a "gradual measurement mode" is provided for measurement of a desired amount by adding (or removing) a small amount of the object to be measured in sequence. In the case where a measuring operation is carried out in a work environment where there is a lot of external vibration, such as vibration in the floor, a "disturbance proof mode" is additionally provided.

Then, appropriate values are provided for the sampling number, which is required to be set when an averaging process is carried out, the amount of fluctuation in weight for starting averaging and the time during which stability continues (hereinafter referred to as "averaging parameters") for each measurement mode, so that an averaging process is carried out with the respective values of the sampling number, the amount of fluctuation in weight for starting averaging and the time during which stability continues when the measurement mode is selected.

Here, the operation portion of conventional electronic balances is described. The operation portion of some conventional electronic balances is provided with a display screen for displaying the results of measurement for the object to be measured in the upper portion and a number of operation keys in a lower portion (see for example Patent Document 1).

In addition, FIG. 7 is a diagram showing the appearance of the operation portion of a conventional electronic balance having a switching function through which the measurement mode can be switched. The operation portion 85 of a conventional electronic balance having a switching function is provided with a display screen 81 for displaying the results of measurement of an object to be measured in an upper portion and four operation keys 82a to 82d in a lower portion.

Incidentally, it is necessary to carry out an input operation for basic functions, such as adjustment of the sensitivity, taring and outputting the results of measurement to a printer, in order to carry out a measurement operation for the object to be measured on the basis of the set measurement mode, in addition to selection and setting of an appropriate measurement mode from among a number of measurement modes when an electronic balance is used.

Therefore, an input operation for determining whether the power supply for the electronic balance is turned on or off is designated to the operation key 82a, an input operation for taring is designated to the operation key 82c, and an input operation for outputting the results of measurement to a printer is designated to the operation key 82b. As shown in FIG. 3, however, conventional electronic balances are provided with only four operation keys 82a to 82d, and therefore, an input operation for adjusting the sensitivity and an input operation for selecting and setting an appropriate measurement mode from among a number of measurement modes are allocated to the remaining operation key 82b, so that they can be switched between for use.

Patent Document 1: Japanese Unexamined Patent Publication H9 (1997)-68459

DISCLOSURE OF THE INVENTION

Problem to Be Solved by the Invention

However, the input operation for adjusting the sensitivity and the input operation for selecting and setting an appropriate measurement mode are allocated together to the operation key 82b, and therefore, the user sometimes switches the operation mode by mistake when they desire to adjust the sensitivity.

In addition, the four operation keys 82a to 82d are aligned laterally in one line, and therefore, it is difficult to discern which operation key is the operation key for selecting and setting the measurement mode.

Means for Solving Problem

Therefore, the present inventors examined the relationship between the location where the operation keys are arranged and the contents in terms of what function is allocated to the operation keys, in order to solve the above described problem. As a result, they found that it is not necessary to carry out an input operation for the setting and switching function to select an appropriate measurement mode when the user is carrying out an input operation for a basic function so as to adjust the sensitivity, carry out taring or output the results of measurement to a printer, in order to carry out an operation for measuring the object to be measured on the basis of the set measurement mode. Accordingly, they found that the user can simply carry out an input operation without making any mistakes when the location where the operation keys to which the basic functions are allocated are arranged and the location where the operation key to which the switching function is allocated are at a distance from each other, instead of providing an operation key to which both the basic functions and the switching function are allocated.

In addition, they found that in electronic balances having applied functions with which one display method is selected and set from among a number of display methods for the results of measurement for an object to be measured, the user in many cases carries out only an input operation for basic functions, without carrying out an input operation for applied functions, though they recognize that applied functions are provided. Accordingly, they found that the user can simply carry out an input operation without making any mistakes when no operation key to which both basic functions and applied functions are allocated is provided, and the location where the operation keys to which the basic functions are allocated are arranged and the location where the operation key to which the switching function is allocated are at a distance from each other.

That is to say, the electronic balance according to the present invention is an electronic balance having a switching function for selecting and setting one measurement mode from among a number of measurement modes corresponding to the type of object to be measured and/or the type of measuring work and/or the situation in terms of the work environment, an applied function for selecting and setting one display method from among a number of display methods for the weight of an object to be measured, and a basic function for gaining results of measurement of an object to be measured on the basis of the set measurement mode and display method, provided with: a number of menu operation keys with which an input operation for selecting and setting one measurement mode from among a number of measurement modes and an input operation for selecting and setting one display method from among a number of display methods are carried out; and a number of basic operation keys with which an input operation for gaining results of measurement for an object to be measured on the basis of the set measurement mode and display method is carried out, wherein the location where the above described number of basic operation keys are arranged and the location where the above described number of menu operation keys are arranged are at a distance from each other.

Here, "measurement mode" means the conditions for measurement, which are selected by the user in accordance with the type of object to be measured, the type of operation for measurement and the situation in terms of the work environment, and "standard measurement mode," where the value of the sampling number, the amount of fluctuation in weight for starting averaging and the time during which stability continues are set as averaging parameters so that the values become appropriate for the operation of measurement for general objects to be measured, "gradual measurement mode," where the parameters are set so that they are appropriate for measurement where a desired amount is measured while a small amount of the object to be measured is added (or removed) in sequence, and "disturbance proof mode," where the parameters are set so that they are appropriate for the operation for measurement in a work environment where there is a lot of external vibration, such as vibration in the floor, can be cited as examples.

In addition, "the display method for the weight of the object to be measured is set" means that the display unit (for example g or kg) for displaying the results of measurement for the object to be measured is determined, or whether the weight of the object to be measured is displayed as it is or the ratio of the weight of the object to be measured to the number of objects to be measured or the reference weight is displayed by registering the reference ratio of the object to be measured in advance is determined.

In the electronic balance according to the present invention, users who want to carry out only a general operation for measuring the object to be measured carries out an input operation only with the basic operation keys. At this time, it is not necessary for the user to worry about the menu operation keys.

In addition, users who want to carry out an operation for measuring an object to be measured in accordance with the type of object to be measured, the type of the operation for measurement and the situation in terms of the work environment first carry out an input operation only with the menu operation keys, and thus, one measurement mode is selected and set from among a number of measurement modes. After that, an input operation is carried out only with the basic operation keys.

Furthermore, users who want to change the display method when carrying out an operation for measuring a general object to be measured carry out an input operation with the menu operation keys, and thus, one display method is selected and set from among a number of display methods. After that, an input operation is carried out only with the basic operation keys.

Effects of the Invention

As described above, in the electronic balance according to the present invention, the location where a number of basic operation keys are arranged and the location where a number of main operation keys are arranged are at a distance from each other, and therefore, in the case where a general operation for measuring the object to be measured is carried out, the input operation can be carried out only with the basic operation keys, without carrying out an input operation for a switching function or an applied function by mistake.

In addition, in the case where an operation for measuring an object to be measured is carried out in accordance with the type of object to be measured, the type of operation for measurement and the situation in terms of the work environment, first an input operation can be carried out only with the menu operation keys, without worrying about the basic operation keys.

Furthermore, in the case where the display method is desired to be changed while carrying out a general operation for measuring the object to be measured, an input operation can be carried out only with the menu operation keys, without worrying about the basic operation keys.

Means for Solving Other Problems and Effects

In addition, in the electronic balance according to the present invention, an input operation for selecting and setting one measurement mode from among a number of measurement modes where different averaging parameters are preset, an input operation for selecting and setting the amount of change that is added to the averaging parameters in the set measurement mode, an input operation for selecting and setting the display unit for displaying the results of measurement for an object to be measured, and an input operation for selecting and setting whether or not the results of measurement when the number of objects to be measured is calculated is displayed are carried out with the above described number of menu operation keys, and an input operation for adjusting the sensitivity, an input operation for adjusting the zero point and/or carrying out taring, and an input operation for outputting the results of measurement to a printer are carried out with the above described number of basic operation keys.

Furthermore, in the electronic balance according to the present invention, the above described number of menu operation keys are provided with an upper key, a lower key, a left key, a right key and a middle key, and the upper key, the lower key, the left key, the right key and the middle key are arranged in cross form with the middle key at the center.

In the electronic balance according to the present invention, the contents in terms of the functions allocated to the menu operation keys can be easily discerned.

BRIEF DESCRIPTION OF THE DRAWINGS

FIG. 7 is a diagram showing the appearance of the operation portion of a conventional electronic balance.

Figure 1:
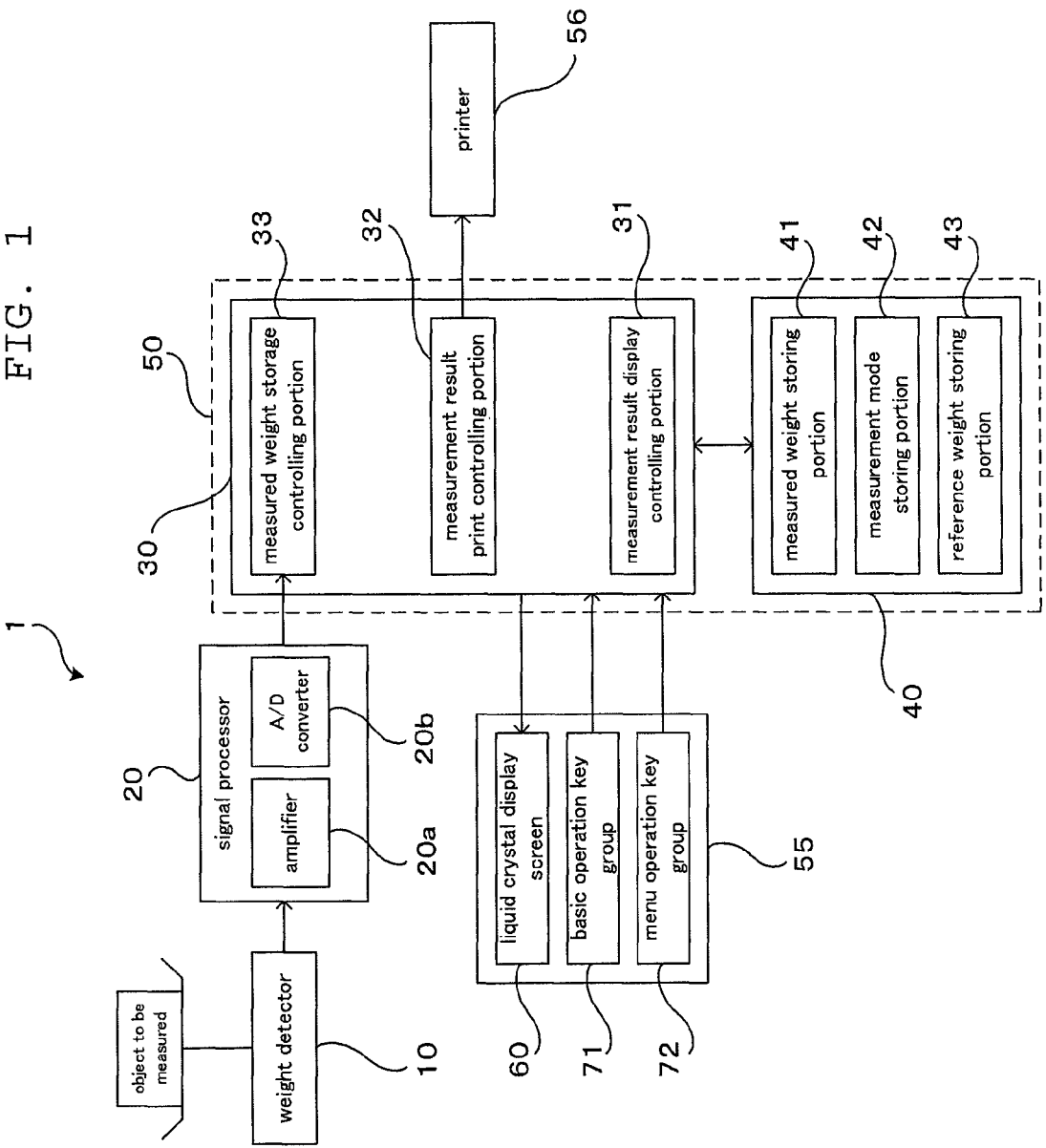
FIG. 1 is a block diagram showing the configuration of an electronic balance according to one example of the present invention.

EXPLANATION OF SYMBOLS 1 electronic balance
31 measurement result display controlling portion
33 measured weight storage controlling portion
41 measured weight storing portion
42 measurement mode storing portion
60 liquid crystal display screen
71a to 71d basic operation keys
72a to 71e menu operation keys

BEST MODE FOR CARRYING OUT THE INVENTION

In the following, the embodiments of the present invention are described in reference to the drawings. Here, the present invention is not limited to the following embodiments, and various modes are, of course, included within such a scope as not to deviate from the gist of the present invention.

Figure 2:
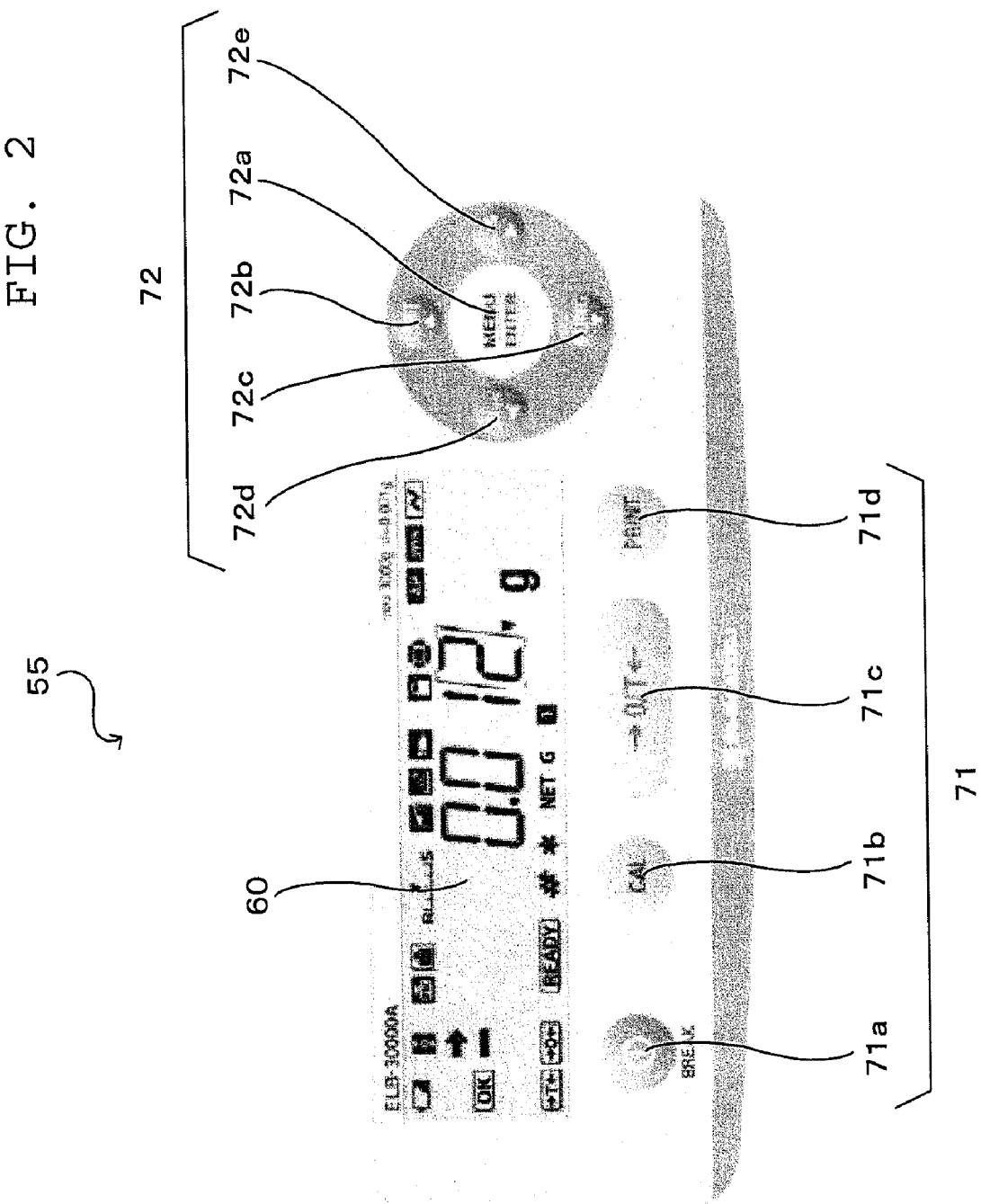
FIG. 2 is a diagram showing the appearance of the operation portion of the electronic balance shown in FIG. 1.

FIG. 1 is a block diagram showing an example of the configuration of the electronic balance according to the present invention, and FIG. 2 is a diagram showing the appearance of the operation portion of the electronic balance shown in FIG. 1.

Here, the electronic balance 1 has a switching function for selecting and setting one measurement mode from among the two measurement modes where different averaging parameters are set in advance, an adjusting function for selecting and setting the amount of change which is applied to the averaging parameters of the set measurement mode, a mass unit function for selecting and setting the display unit (display method) for displaying the results of measurement (application function), a display content function for selecting and setting whether the weight of the object to be measured is displayed or the number of objects to be measured is displayed (displaying method) (application function), and a basic function for gaining the results of measurement of the object to be measured using the set averaging parameters and displaying method.

In addition, for the sake of simplicity, in the description of the present embodiments, the number of measurement modes include two measurement modes: "standard measurement mode" and "gradual measurement mode," which are preset so that only the sampling number m is different.

Here, sampling number means the number of times the weight is measured for averaging. Accordingly, the greater the set sampling number is, the more "stability in the results of measurement" can be achieved, while the greater the sampling number is, the longer it takes to display the results. Meanwhile, the smaller the set sampling number is, the more the "response of the results of measurement" can be achieved, while the smaller the sampling number is, the easier the results of measurement fluctuate without the effects of various types of vibration noise subsiding.

Therefore, "standard measurement mode" is set placing importance on the "stability in the results of measurement," and in the present embodiment, the sampling number m (hereinafter referred to as reference sampling number for standard measurement mode) is preset to "6." As a result, the reference sampling number m is set to a number as high as 6, and therefore, when the user selects and sets "standard measurement mode," the weight is measured, the sampling number m=6 times, and the results are collected and averaged, even when various types of vibration noise are included in the measured weight, and thus, results of measurement where the effects of vibration noise are subdued can be gained.

In addition, "gradual measurement mode" is set placing importance on the "response of the results of measurement," and in the present embodiment, the sampling number (hereinafter referred to as reference sampling number in gradual measurement mode) m is preset to "3." As a result, the reference sampling number m is as small as 3, and therefore, when the user selects "gradual measurement mode," the time for calculating the results of measurement becomes short, and the object to be measured can be quickly placed on the balance and removed.

Here, in the present embodiment, "standard measurement mode" is selected and set in advance from among the two measurement modes: "standard measurement mode" and "gradual measurement mode," as the initial setting.

In addition, the mass unit function allows any of "mg," "g" and "kg" to be selected and set as the display unit for displaying the results of measurement on the liquid crystal display screen 60. Here, "g" is selected and set as the initial setting. Furthermore, the display content function allows either the weight of the object to be measured or the number of objects to be measured to be selected and set for display. Here, the "weight" is selected and set in advance as the initial setting. In addition, it is necessary to store the weight of one object to be measured (reference weight) in the reference weight storing portion 43 (described below) in advance in order to display the number of objects to be measured.

The electronic balance 1 is provided with a weight detector 10, a signal processor 20, a microcomputer 50, an operation portion 55 made up of a basic operation key group 71, a menu operation key group 72 and a liquid crystal display screen 60, and a printer 56.

The weight detector 10 detects the weight of the object to be measured which is placed on the upper surface of the measuring dish by means of a load cell (not shown) and outputs analog signals to the signal processor 20 in sequence at predetermined time intervals.

The signal processor 20 is provided with an amplifier 20a for amplifying analog signals detected by the weight detector 10, and an A/D converter 20b for converting analog signals into digital signals (measured weight) after amplification.

The operation portion 55 is formed of a basic operation key group 71, a menu operation key group 72 and a liquid crystal display screen 60 for displaying the results of measurement (see FIG. 2).

The basic operation key group 71 is made up of four basic operation keys 71a to 71d which are aligned laterally in the arrangement.

An input operation for determining whether the power of the electronic balance 1 is turned on or off is allocated to the basic operation key 71a. As a result, the power of the electronic balance 1 can be turned on or off when the user presses the basic operation key 71a.

In addition, an input operation for adjusting the sensitivity is allocated to the basic operation key 72b. As a result, the sensitivity can be adjusted when the user presses the basic operation key 72b.

In addition, an input operation for taring is allocated to the basic operation key 72c. As a result, "0" can be set in a state where a bag (object to be measured) is placed on the upper surface of the measuring dish when the user presses the basic operation key 72c. In addition, an input operation for outputting the results of measurement to the printer 56 is allocated to the basic operation key 82d. As a result, paper on which the results of measurement are printed can be gained when the user presses the basic operation key 72d.

Accordingly, in the electronic balance 1 according to the present embodiment, the operation for measuring an object to be measured can be carried out when the user carries out an input operation using only the basic operation key group 71, without using the menu operation key group 72, in the case where an operation for measuring a general object to be measured is carried out.

The menu operation key group 72 is made up of a middle key (menu operation key) 72a, an upper key (menu operation key) 72b, a lower key (menu operation key) 72c, a left key (menu operation key) 72d and a right key (menu operation key) 72e, and the middle key 72a, the upper key 72b, the lower key 72c, the left key 72d and the right key 72e are arranged in cross form with the middle key 72a at the center.

An input operation for bringing up a measurement mode selection screen for selecting and setting one measurement mode from "standard measurement mode" and "gradual measurement mode" is allocated to the middle key 72a. In addition, in a state where the measurement mode selecting screen has been brought up, an input operation for selecting one measurement mode from "standard measurement mode" and "gradual measurement mode" is allocated to the upper key 72b and the lower key 72c. Concretely, the user can bring up the measurement mode selection screen by pressing the middle key 72a, switch the measurement mode that is set at the time forward to another measurement mode by pressing the upper key 72b once, switch the mode forward to another mode by pressing the middle key 72 once more, switch the measurement mode that is set at the time backward to another measurement mode by pressing the lower key 72c once, switch the mode backward to another measurement mode by pressing the lower key 72c once more, and set a desired measurement mode when a desired measurement mode is selected using the upper key 72b and the lower key 72c, and then the middle key 72a is pressed.

At this time, when "standard measurement mode" is set, the averaging parameters become the reference sampling number m=6 in standard measurement mode, while when "gradual measurement mode" is set, the averaging parameters become the reference sampling number m=3 in gradual measurement mode. That is to say, the user selects either the reference sampling number n, "standard measurement mode" or gradual measurement mode" as the averaging parameter, so that the parameter corresponds to the type of object to be measured, the type of measurement operation and the situation in terms of the work environment.

In addition, an input operation for selecting and setting the amount of change which is applied to the averaging parameters in the set measurement mode is allocated to the left key 72d and the right key 72d. Concretely, when the user presses the left key 72d, the sampling number is adjusted so as to be smaller than the sampling number m at the time (m−1), and as a result, the response of the results of measurement displayed on the liquid crystal display screen 60 becomes faster, and furthermore, when the left key 72d is pressed once more, the sampling number is adjusted so as to be smaller still by 1, and as a result, the response of the results of measurement displayed on the liquid crystal display screen 60 becomes faster. Meanwhile, when the user presses the right key 72d, the sampling number is adjusted so as to be greater than the sampling number m at the time (m+1), and as a result, the results of measurement displayed on the liquid crystal display screen 60 become more stable, and furthermore, when the right key 72d is pressed once more, the sampling number is adjusted so as to be greater still by 1, and as a result, the results of measurement displayed on the liquid crystal display screen 60 become more stable.

In addition, in a state where the measurement mode selection screen has not been brought up, an input operation for selecting and setting the display unit for displaying the results of measurement of the object to be measured is allocated to the upper key 72b. As a result, when the user presses the upper key 72b, the display unit for displaying the results of measurement of the object to be measured can be changed from, for example, "g" to "kg."

In addition, an input operation for selecting and setting whether the weight of the object to be measured is displayed or the number of objects to be measured is displayed is allocated to the lower key 72c in a state where the measurement mode selection screen has not been brought up. Concretely, when the user presses the lower key 72c, whether the weight of the object to be measured is displayed as the results of measurement for the object to be measured or the number of objects to be measured is calculated by dividing the weight of the object to be measured by the reference weight that has been registered in advance and displayed can be selected and set.

The microcomputer 50 is formed of a CPU (data processing unit) 30 and a memory 40. When the functions of the CPU 30 are divided into blocks for the description, the CPU 30 has a measured weight storage controlling portion 33, a measurement result display controlling portion 31 and a measurement result print controlling portion 32.

In addition, the memory 40 has a measurement weight storing portion 41 for storing the measured weight (digital signals) in sequence, a measurement mode storing portion 42 for storing two measurement modes: "standard measurement mode" and "gradual measurement mode," and a reference weight storing portion 43 for storing the reference weight.

The measurement weight storage controlling portion 33 carries out such control as to detect the weight of the object to be measured by means of the weight detector 10 on the basis of the adjusted sensitivity that has been set using the basic operation key group 71 and the results of measurement of taring, and store the measured weight that has been converted to digital signals by means of the signal processor 20 in the measured weight storing portion 41 in sequence at predetermined time intervals.

The measurement result display controlling portion 31 carries out such control that the average weight, which is the movement average of the weight that is measured the sampling number m of times, is calculated in sequence when the measured weight is stored in the measured weight storing portion 41 in sequence using the sampling number that is adjusted using the menu operation key group 72, and the results of measurement are displayed on the liquid crystal display screen 60 in accordance with the display method set using the menu operation key group 72.

The measurement result print controlling portion 32 carries out such control as to output the results of measurement to the printer 56 on the basis of the signal from the basic operation key group 71.

Figure 3:
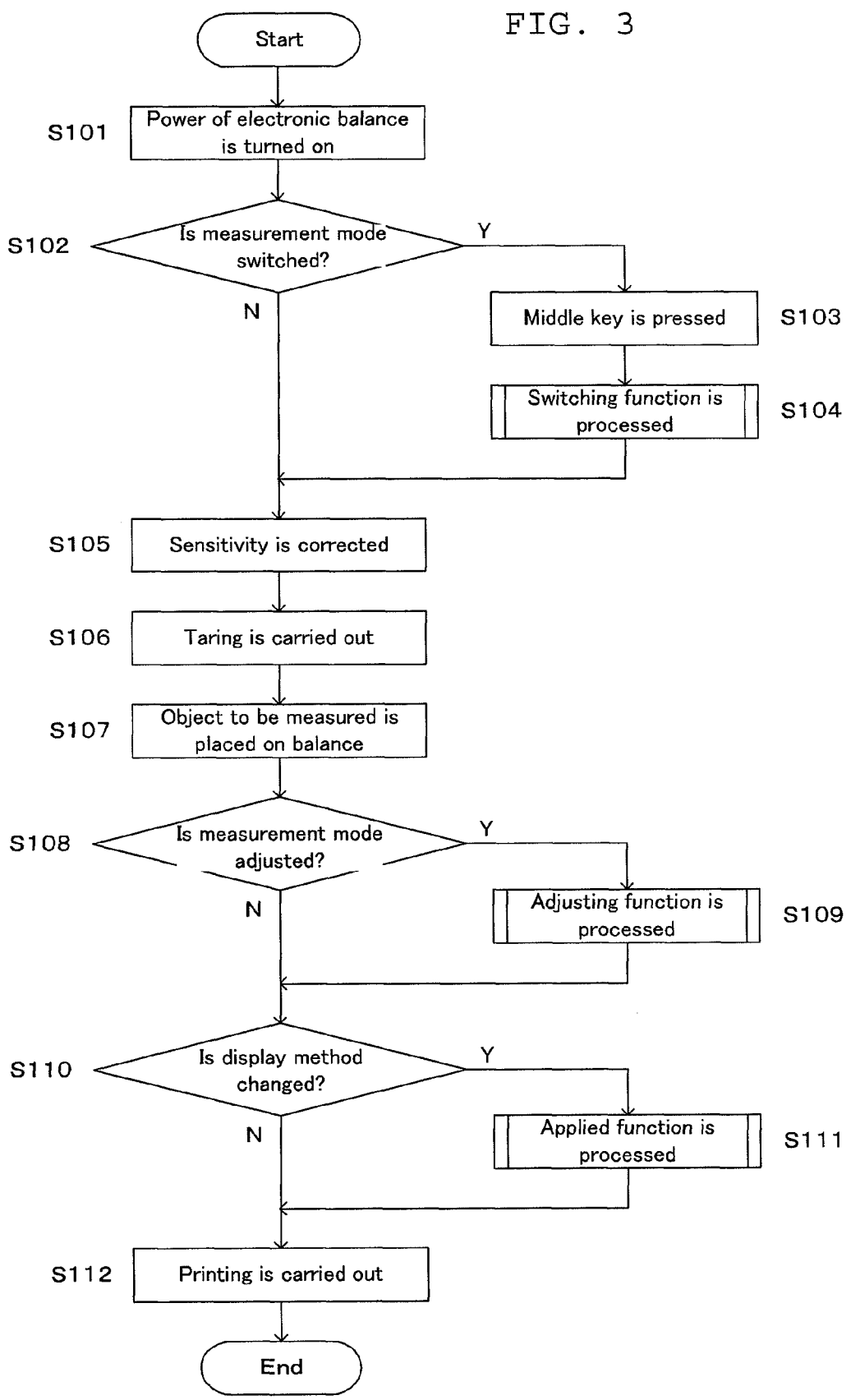
FIG. 3 is a flow chart for illustrating a method for using an electronic balance.

Next, an example of a method using the electronic balance 1 is described. FIG. 3 is a flow chart for illustrating an example of a method using the electronic balance 1.

First, in the process in step S101, the basic operation key 71a is pressed, and thus, the power of the electronic balance 1 is turned on.

Next, in the process in step S102, whether or not the measurement mode should be switched is determined. In the case where it is determined that the measurement mode should be switched, the procedure proceeds to the process in step S103, and when the middle key 72a is pressed, the switching process (described below) is carried out as the process in step S104.

Meanwhile, in the case where it is determined that the measurement mode should not be switched, the basic operation key 72b is pressed in the process in step S105, and thus, the sensitivity is corrected.

Next, in the process in step S106, the basic operation key 72c is pressed, and thus, a state where a bag (object to be measured) is placed on the upper surface of the measuring dish is set to "0."

Next, in the process in step S107, the object to be measured is placed on the upper surface of the measuring dish.

Next, in the process in step S108, whether or not the averaging parameters for the measurement mode should be adjusted is determined. In the case where it is determined that the averaging parameters for the measurement mode should be adjusted, an adjusting process (described below) is carried out in the process in step S109.

Meanwhile, in the case where it is determined that the averaging parameters for the measurement mode should not be adjusted, whether or not the display method should be changed is determined in the process in step S110. In the case where it is determined that the display method should be changed, an application process (described below) is carried out in the process in step S111.

Meanwhile, in the case where it is determined that the display method should not be changed, the basic operation key 72d is pressed in the process in step S112, and thus, paper on which the results of measurement are printed is gained.

Finally, in the case where the process in step S112 is completed, the present flow chart is completed.

Figure 4:
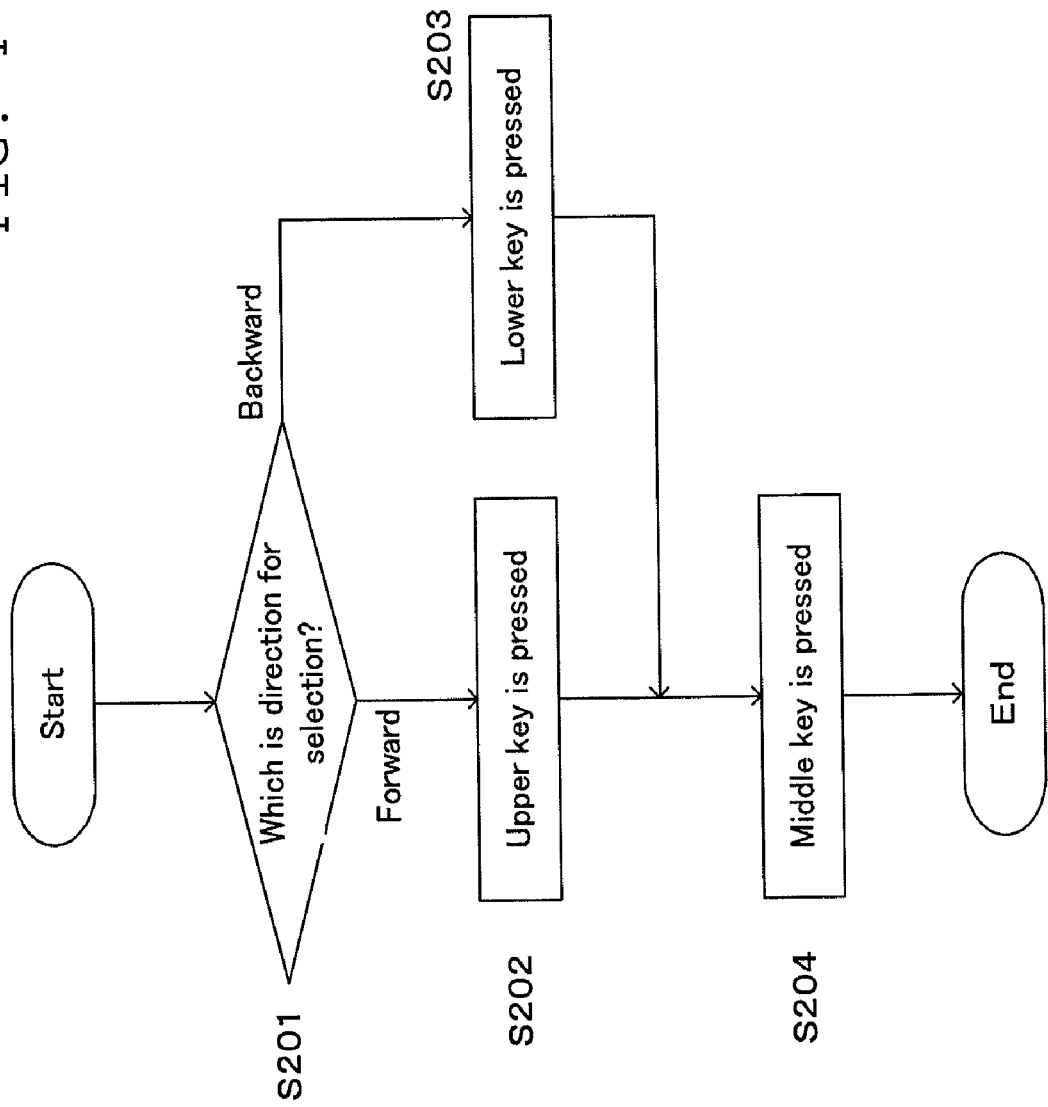
FIG. 4 is a flow chart for illustrating another method for using an electronic balance.

Next, the switching process is described. FIG. 4 is a flow chart for illustrating the switching process.

First, in the process in step S201, it is determined whether the measurement mode should be switched forward and another mode selected or the measurement mode should be switched backward and another mode selected. In the case where it is determined that the measurement mode should be switched forward and another mode selected, the procedure progresses to the process in step S202, and thus, the measurement mode is switched when the upper key 72b is pressed.

Meanwhile, in the case where it is determined that the measured mode should be switched backward and another mode selected, the procedure progresses to the process in step S203, and thus, the measurement mode is switched when the lower key 72c is pressed.

Next, in the process in step S204, the measurement mode is determined when the middle key 72a is pressed, and thus, the present flow chart is completed.

Figure 5:
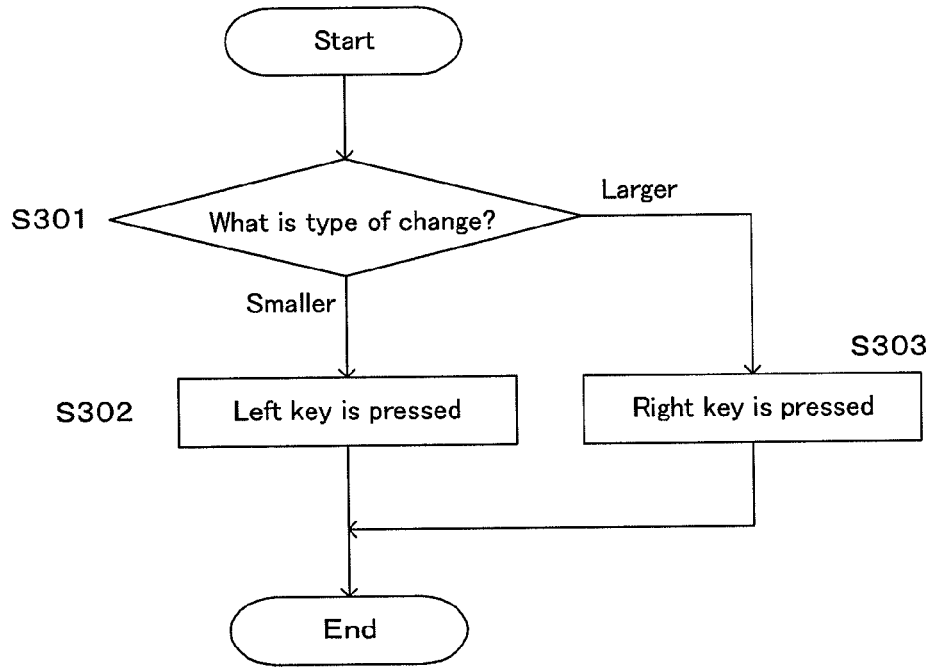
FIG. 5 is a flow chart for illustrating still another method for using an electronic balance.

Next, the adjusting process is described. FIG. 5 is a flow chart for illustrating the adjusting process.

First, in the process in step S301, it is determined whether the averaging parameters for the measurement mode should be increased or decreased. In the case where it is determined that the averaging parameters for the measurement mode should be decreased, the procedure progresses to the process in step S302, and thus, the left key 72c is pressed.

Meanwhile, in the case where it is determined that the averaging parameters for the measurement mode should be increased, the procedure progresses to the process in step S303, and thus, the right key 72d is pressed.

Then, in the case where the process in step S302 or S303 is completed, the present flow chart is completed.

Figure 6:
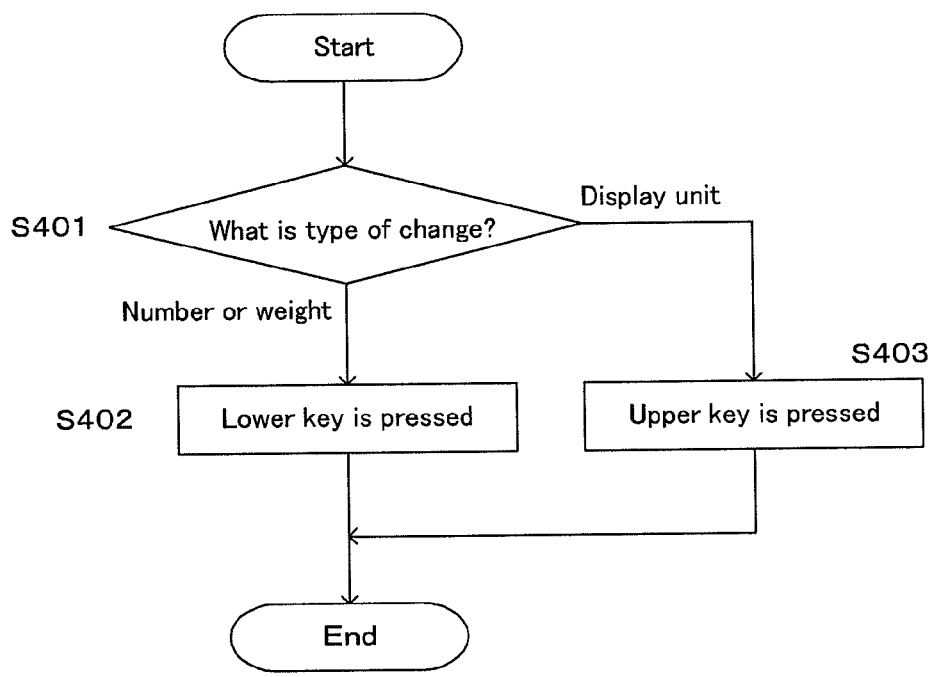
FIG. 6 is a flow chart for illustrating yet another method for using an electronic balance.

Next, the application process is described. FIG. 6 is a flow chart for illustrating the application process.

First, what type of change the display method relates to is determined in the process in step S401. In the case where it is determined that the change relates to the weight or number, the procedure progresses to the process in step S402, and thus, the lower key 72c is pressed.

Meanwhile, in the case where it is determined that the change relates to the display unit, the procedure progresses to the process in step S403, and thus, the upper key 72b is pressed.

Then, in the case where the process in step S402 or S403 is completed, the present flow chart is completed.

As described above, in the electronic balance 1 according to the present invention, the location where the four basic operation keys 71a to 71d are placed and the location where the five menu operation keys 72a to 72e are placed are at a distance from each other, and therefore, in the case where a general operation for measuring the object to be measured is carried out, an input operation for a switching function and an application function can be carried out using only the basic operation keys 71a to 71d without causing any error.

In addition, in the case where a operation for measuring an object to be measured is carried out in accordance with the type of the object to be measured, the type of the measuring operation and the situation in terms of the work environment, an input operation can be carried out first using only the menu operation keys 72a to 72e, without having to worry about the basic operation keys 71a to 71d Furthermore, in the case where the display method is desired to be changed when a general operation for measuring the object to be measured is carried out, an input operation can be carried out using only the menu operation keys 72a to 72e, without having to worry about the basic operation keys 71a to 71d.

In addition, the middle key 72a, the upper key 72b, the lower key 72c, the left key 72d and the right key 72e are arranged in cross form with the middle key 72a at the center, and therefore, the contents allocated to the menu operation keys 72a to 72e can be easily discerned.

INDUSTRIAL APPLICABILITY

The present invention can be applied to electronic balances where an appropriate measurement mode can be selected and set in accordance with the type of object to be measured, the type of operation for measurement, and the situation in terms of the work environment, so that the operation for measuring the object to be measured can be carried out on the basis of the set measurement mode.

The invention claimed is:

1. An electronic balance having a switching function for selecting and setting one measurement mode from among a number of measurement modes corresponding to the type of object to be measured and/or the type of measuring work and/or the situation in terms of the work environment, an applied function for selecting and setting one display method from among a number of display methods for the weight of an object to be measured, and a basic function for gaining results of measurement of an object to be measured on the basis of the set measurement mode and display method, comprising:

a number of menu operation keys with which an input operation for selecting and setting one measurement mode from among a number of measurement modes and an input operation for selecting and setting one display method from among a number of display methods are both able to be carried out; a number of basic operation keys with which an input operation for adjusting the sensitivity, an input operation for adjusting the zero point and/or carrying out taring, and an input operation for outputting the results of measurement to a printer are all able to be carried out in order to gain results of measurement for an object to be measured on the basis of the set measurement mode and display method, characterized in that the location where said number of basic operation keys are arranged and the location where said number of menu operation keys are arranged are at a distance from each other, and said number of menu operation keys include a top key, a center key, a bottom key, a left key and a fight key arranged in a cross form; and an input operation for selecting and setting one measurement mode from among a number of measurement modes where different averaging parameters are preset, an input operation for selecting and setting the amount of change that is added to the averaging parameters in the set measurement mode, an input operation for selecting and setting the display unit for displaying the results of measurement for an object to be measured, and an input operation for selecting and setting whether or not the results of measurement when the number of objects to be measured is calculated is displayed are all able to be calculated using only said number of menu operations keys, the input operation for selecting and setting one measurement mode from among a number of measurement modes where different averaging parameters are preset is able to be carried out with the middle key, the upper key and the lower key, the input operation for selecting and setting the amount of change that is added to the averaging parameters in the set measurement mode is able to be carried out with the left key and the fight key, and the input operation for selecting and setting the display unit for displaying the results of measurement for an object to be measured, and the input operation for selecting and setting whether or not the results of measurement when the number of objects to be measured is calculated is displayed is able to be carried out with the upper key and the lower key.

* * * * *